Feb. 17, 1953 R. J. GUBA 2,628,706
WIRE CONVEYER BELT DRIVE
Filed Dec. 29, 1949 2 SHEETS—SHEET 1

*INVENTOR.*
RAYMOND J. GUBA
BY John W. Myers
ATTORNEY

Feb. 17, 1953     R. J. GUBA     2,628,706
WIRE CONVEYER BELT DRIVE
Filed Dec. 29, 1949     2 SHEETS—SHEET 2

INVENTOR.
RAYMOND J. GUBA
BY *John D. Myers*
ATTORNEY

Patented Feb. 17, 1953

2,628,706

UNITED STATES PATENT OFFICE 2,628,706

WIRE CONVEYER BELT DRIVE

Raymond J. Guba, Philadelphia, Pa., assignor to Audubon Wire Cloth Corporation, a corporation of New Jersey Application December 29, 1949, Serial No. 135,710

3 Claims. (Cl. 198—203)

The invention relates to a wire conveyor belt drive and is directed specifically to a structure in which helical coils at regular intervals throughout the length of the belt are so formed as to extend inwardly from the inner face of the belt in such a manner as to provide means for driving the belt directly from a driving roll designed to cooperate with a belt of this particular formation.

As they have been constructed heretofore, it has been thought necessary to provide a woven wire conveyor belt with some auxiliary means or attachment which would serve as the driving means. Where the driving means is arranged within the width of the belt proper, such auxiliary means has usually been in the form of separate bars or other means extending across the belt and suitably secured thereto. Driving means of that character usually necessitate a substantial amount of added labor and material in the manufacture of the belt due to the fact that the driving elements are added after the completion of the belt proper. Furthermore, such driving means usually detract from the appearance of the belt when used in locations where this is of any importance.

One of the principal objects of the present invention therefore is the provision of a wire conveyer belt which is so constructed that certain coils, spaced at regular intervals throughout the length of the belt, are so formed that the portions of the turns on the inner face of the belt extend inwardly beyond the inner face to such an extent as to serve as the driving means for the belt.

It is also well known to those who are familiar with woven wire conveyer belts that such belts have a tendency to stretch when they are in use, and some means must be provided to compensate for the consequent increase in length. The usual practice in overcoming this difficulty is to provide the conveyer with belt tightening rolls, or to support the driving rolls so that they can be adjusted bodily in order to take up any slack in the belt. Adjustments of this kind are not satisfactory, however, where a roll is used for driving the belt and the drive operates directly upon the belt. This will be apparent from the fact that an increase in the length of the belt results in an increase in the distance between successive driving elements on the belt, and this increase in distance is not compensated for by the usual belt tightener or by adjusting the bearing supports for the driving rolls. As a result of this increase in the length of the belt, the driving means on the belt is out of pitch with the cooperating driving means on the driving roll so that the driving elements on the belt tend to climb outwardly in the usual grooves on the driving roll, or the belt is forced to slip on the roll to a slight extent, and undue strain is thereby thrown upon the driving elements which are thus required to drive the belt at any given moment.

It is therefore another object of the invention to provide, in a woven wire belt conveyer structure, driving means integral with the belt and forming a part thereof, together with a driving roll having cooperating driving means thereon and so constructed that the roll may be utilized as a belt tightener while maintaining the driving means on the roll in pitch with the driving means on the belt.

Other objects and advantages of the improvements will be apparent from the following description, taken with the accompanying drawing, wherein.

Figure 2:
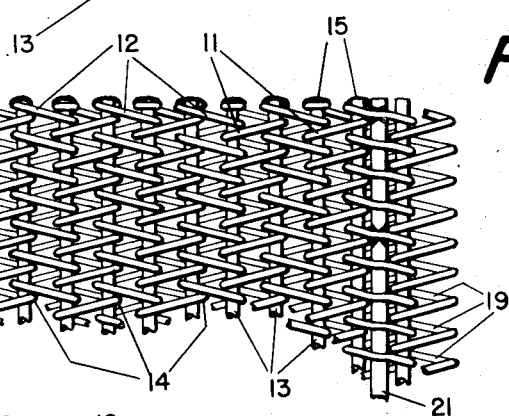
Fig. 2 is a bottom plan view of a portion of a conveyer belt embodying the driving coils of the present improvement.
Figure 3:
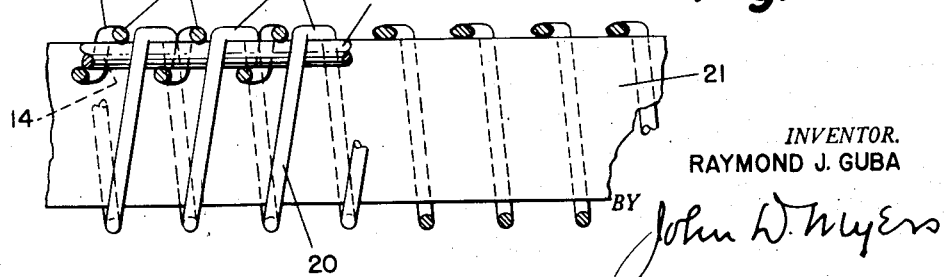
Fig. 3 is a detailed side elevational view through one of the belt driving coils, with parts thereof shown in section.

While the invention may be utilized with other forms of wire belts, as disclosed herein it is incorporated in a belt 10 which is made up of a succession of coils of opposite twist. As will be seen from Fig. 2, right hand coils 11 are arranged in overlapping relation with left hand coils 12 and the coils are held in this position by means of hinge rods 13 extending through the overlapping bights 14. As is well understood in the art, each hinge rod 13 is preferably welded to one of the coils, as indicated at 15, so as to resist endwise contraction of the coils, and at the same time provide the hinging action which is necessary to produce a flexible structure.

Figure 1:
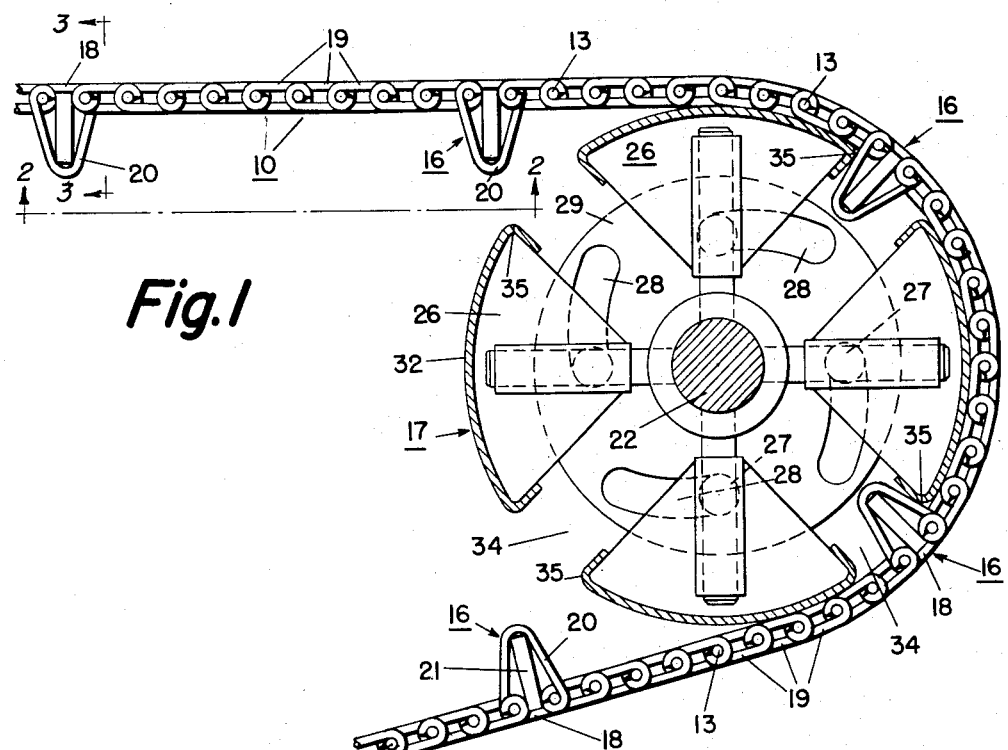
Fig. 1 is a longitudinal sectional view, partly in elevation and taken substantially on the line 1—1 of Fig. 4, showing a portion of a conveyer belt structure having the present improvements incorporated therein.

At intervals throughout the length of the belt driving coils 16 are interposed. Coils 16 are of a twist to conform to the design of the belt and they are so formed as to provide driving means for cooperating with the driving means on the improved driving roll 17. The driving coils 16 thus serve as connecting coils for adjacent belt sections made of coils having such a formation as to provide substantially flat faces on the opposite sides of the belt as shown in Fig. 1. The driving coils 16 are preferably so formed that the portions 18 of the turns in the outer face of the belt are substantially flush with the outer face and are of the same length as the corresponding portions 19 of the coils forming the sections referred to above. The portions 20 of the turns of the driving coils on the opposite face of the belt are formed so as to extend inwardly a substantial distance from the inner face of the belt to thus provide driving means integral with the belt and presenting on the outer face of the belt an appearance similar to the main coils which make up each belt section.

As disclosed herein the turns of the driving coils 16 are of substantially triangular shape, but this particular formation is not essential. In order to maintain their shape, a rigid stay bar 21 is inserted in each of the driving coils 16. The stay bars 21 are preferably of such shape and size that one edge contacts with the portions 18 of the turns of the driving coil while the opposite edge contacts with the inner ends of portions 20 of the turns as shown in Fig. 1. Stay bars 21 are preferably welded to the ends of the driving coils 16, also to suitable intermediate turns if desired.

Figure 4:
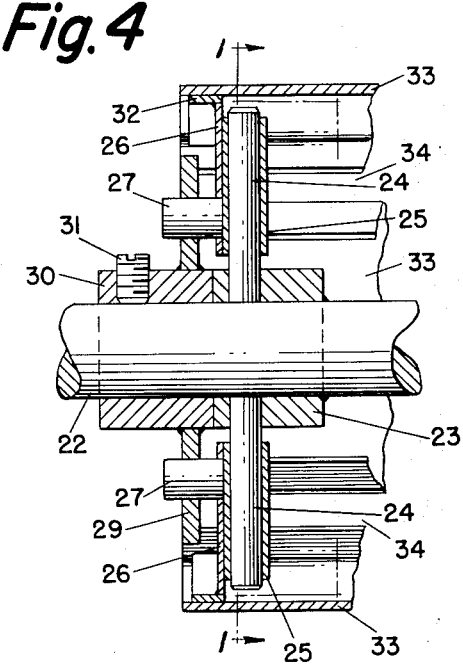
Fig. 4 is a longitudinal sectional view through one end of the belt driving roll, showing the same in contracted position.
Figure 5:
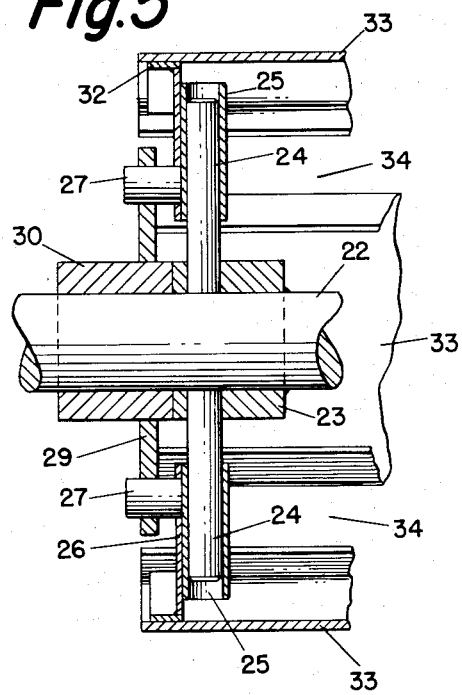
Fig. 5 is a view similar to Fig. 4, but showing the roll in expanded position.
Figure 6:
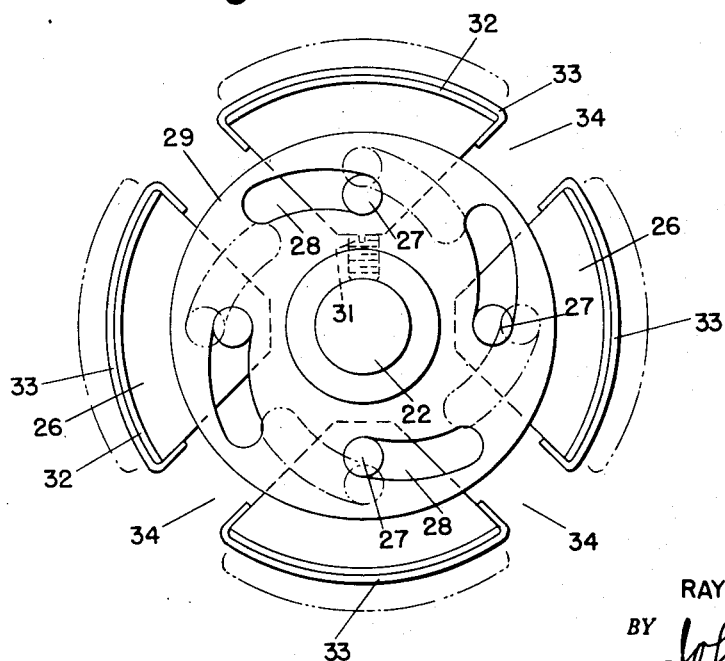
Fig. 6 is an elevational view of one end of the driving roll, showing the cam arrangement for varying the diameter of the roll.

The expansible driving roll 17 which has been devised for cooperation with the belt 10 described above is mounted on a drive shaft 22 which may be supported and driven in any suitable manner. While a single drive roll is shown, it will be understood that additional rolls may be used if desired. The opposite ends of the drive roll 17 are of similar construction, and it will be understood that the disclosure herein is equally applicable to both ends thereof. As shown in Figs. 4 and 5, a hub 23 is welded or otherwise secured to the drive shaft 22. Secured to and extending radially from the hub 23 are four equally spaced arms 24 which serve to support the belt-engaging portions of the roll for movement in a radial direction with respect to the shaft 22.

Slidably mounted on the outer end of each radial arm 24 is a sleeve 25 having a sectoral plate 26 secured thereto. A pin 27 secured to each plate 26 extends outwardly toward the end of the roll into a curved cam slot 28 in a cam plate 29. Cam plate 29 is welded or otherwise fastened to a hub 30 adjustably held on the shaft 22 by means of a set screw 31. The arcuate portion 32 of each plate 26 is secured near one end of a segmental roll element 33. The segmental elements 33 are curved to form the surface of the roll, and they are spaced from each other so as to provide longitudinal channels 34 for receiving the inwardly extending portions 20 of the driving coils. As shown in Fig. 1, the advancing edge 35 of each segmental element 33 contacts with the extending portions 20 of the driving coils in transmitting motion from the roll to the belt.

In case it becomes desirable to expand the driving roll to compensate for stretching or an increase in length of the conveyer belt, this may be easily and quickly done by merely loosening the set screws 31 and turning the hubs 30 on the drive shaft by a suitable tool, such as a spanner wrench, and then securing hubs 30 in the desired position of adjustment. As will be apparent from the disclosure, the rotation of hub 30 carries with it the cam plate 29, and this in turn operates through pins 27, sleeves 25, and plates 26 to move the segmental plates 33 outwardly in a radial direction to provide the desired increase in the diameter of the driving roll.

As will be apparent from the structure of the improved driving roll, the linear distance between the advancing edges 35, measured on the surface of the roll, increases when the roll is expanded, thereby taking care of an increase in the length of the belt because of normal stretching when it is in use. It will also be apparent that this increase in the distance between the advancing edges 35 may be utilized to compensate for the consequent increase in distance between the driving coils 16 when the belt increases in length after a period of use. As a result, the driving elements of the roll may be kept in pitch with portions 20 of the driving coils 16, and the roll driving elements 33 which are in contact with driving coils at any moment assume their proper share of the driving load.

While one form of the improved belt structure is disclosed herein, together with one form of improved driving roll designed for use with such a belt, it will be understood that the invention is not limited to the precise construction and arrangement of the various parts as they are shown and described. It will also be understood that the invention is intended to include all such forms of the improvements as come within the scope of the appended claims.

What is claimed is:

1. A conveyer belt construction comprising a succession of sections made of helical coils of wire successively connected in overlapping relation to form substantially flat inner and outer faces, a helical connecting coil interposed between successive sections for connecting the same and having portions of the turns thereof extending inwardly a substantial distance from the flat inner face of said sections to provide driving means for the belt, and a belt driving roll comprising a plurality of segmental elements extending lengthwise thereof and spaced circumferentially from each other to provide longitudinal channels to receive said driving means, a radially adjustable support on each end of said segmental sections, and cam means operatively connected to the support at each end of said roll for adjusting said segmental elements radially of the roll.

2. A conveyer construction comprising a succession of sections made of helical coils of wire successively connected in overlapping relation to form substantially flat inner and outer faces, a helical connecting coil interposed between successive sections for connecting the same and having portions of the turns thereof extending inwardly a substantial distance from the flat inner face of said sections to provide driving means for the belt, and a stay bar extending through each of said connecting coils and engaging therewith to maintain the shape of said connecting coils.

3. A wire conveyer belt comprising a plurality of sections made of helical coils of wire successively connected in overlapping relation to form substantially flat faces, a helical coil of wire connecting the adjacent ends of successive sections and having the outer face thereof arranged in the plane of the outer face of the belt and having the inner face thereof extending inwardly a substantial distance from the inner face of the belt to provide driving means for the belt, and a rigid stay bar extending through each of said connecting coils in contact with the turns of the connecting coils and having the opposite ends thereof secured to the connecting coils.

RAYMOND J. GUBA.

REFERENCES CITED

The following references are of record in the file of this patent:

UNITED STATES PATENTS

| Number | Name | Date |
|---|---|---|
| 522,427 | Leggo | July 3, 1894 |
| 607,322 | Adams | July 12, 1898 |
| 742,497 | Rowand | Oct. 27, 1903 |
| 1,689,556 | Nichols | Oct. 30, 1928 |
| 1,921,197 | Larson | Aug. 8, 1933 |
| 2,370,954 | Guba | Mar. 6, 1945 |

FOREIGN PATENTS

| Number | Country | Date |
|---|---|---|
| 92,186 | Germany | July 2, 1897 |